United States Patent [19]

Spietschka et al.

[11] Patent Number: 4,460,410
[45] Date of Patent: Jul. 17, 1984

[54] PROCESS FOR THE MANUFACTURE OF A PERYLENE TETRACARBOXYLIC ACID DIANHYDRIDE PIGMENT

[75] Inventors: Ernst Spietschka, Idstein/Taunus; Manfred Urban, Wiesbaden, both of Fed. Rep. of Germany

[73] Assignee: Hoechst AG, Frankfurt am Main, Fed. Rep. of Germany

[21] Appl. No.: 451,822

[22] Filed: Dec. 21, 1982

[30] Foreign Application Priority Data

Dec. 23, 1981 [DE] Fed. Rep. of Germany ....... 3150956

[51] Int. Cl.$^3$ ................... C04B 31/00; C09D 11/00; C07D 311/02
[52] U.S. Cl. .................. 106/19; 106/288 Q; 106/308 F; 524/112; 549/232
[58] Field of Search ............ 106/219, 19, 288 Q; 549/232

[56] References Cited

U.S. PATENT DOCUMENTS

| | | | |
|---|---|---|---|
| 3,628,976 | 12/1971 | Stocker | 549/232 |
| 3,775,434 | 11/1973 | Spietschka et al. | 549/232 |
| 3,880,890 | 4/1975 | Fabian | 549/232 |
| 4,250,079 | 2/1981 | Babler | 524/112 |
| 4,262,851 | 4/1981 | Graser et al. | 106/288 Q |

*Primary Examiner*—Theodore Morris
*Attorney, Agent, or Firm*—Curtis, Morris & Safford

[57] ABSTRACT

A perylene-3,4,9,10-tetracarboxylic acid dianhydride pigment, useful as a varnish pigment, made by adding an aqueous solution of an alkali metal salt of perylene-3,4,9,10-tetracarboxylic acid and a surfactant to an acid at a pH below 3, at 0° C. to 90° C., and then heating the suspension so obtained at 50° C. to 150° C.

13 Claims, No Drawings

PROCESS FOR THE MANUFACTURE OF A PERYLENE TETRACARBOXYLIC ACID DIANHYDRIDE PIGMENT

It is known to use perylene-3,4,9,10-tetracarboxylic acid dianhydride, hereinafter named "dianhydride" as a pigment for coloring varnishes and plastic material. The manufacture of pigmentary forms of this compound has been described in the following publications:

The process of U.S. Pat. No. 3,775,434 comprises precipitating the free tetracarboxylic acid from an alkaline aqueous solution of an alkali metal salt of 3,4,9,10-perylene-tetracarboxylic acid, hereinafter named tetracarboxylic acid or per acid, at $-20°$ to $+30°$ C. by means of an acid and heating the suspension obtained in the presence of an organic solvent to 35° to 200° C. to convert said tetracarboxylic acid to its dianhydride. A dispersant may be added prior to, during or after the addition of the acid. The pigment obtained dyes varnishes in clear red shades and is distinguished by a good tinctorial strength, a good fastness to weathering, to light and to oervarnishing.

U.S. Pat. No. 3,628,976 describes the manufacture of pure and transparent perylene pigments of high tinctorial strength by precipitation of the pigment from an aqueous solution of a salt of perylene-3,4,9,10-tetracarboxylic acid in the presence of at least 0.2 weight % of a dispersant, referred to the weight of tetracarboxylic acid, at 20° to 100° C., by adding an acid.

U.S. Pat. No. 4,250,079 describes the manufacture of the dianhydride having an improved dispersability by adding to an aqueous-alkaline solution of an alkali metal salt of perylene-tetracarboxylic acid at least one primary aliphatic or cycloaliphatic amine having at least 12 carbon atoms, acidifying the reaction mixture to precipitate the free tetracarboxylic acid, and heating the reaction mixture to convert said free tetracarboxylic acid to its dianhydride. Acidifying may be done by subsequently introducing the amine and the quantity of an inorganic acid necessary for releasing the tetracarboxylic acid into an organic solvent, and by adding dropwise the aqueous solution of the alkali metal salt of perylene-tetracarboxylic acid to the resulting mixture. Part of the molecules in the pigment obtained have an imide group derived from the amine added instead of the anhydride group, the introduction of said imide group being intended to improve plastics coloration.

It has now been found that a dianhydride pigment of particularly good quality is obtained by adding an aqueous solution of the alkali metal salts of perylene 3,4,9,10-tetracarboxylic acid, with addition of surfactants, at 0° to 90° C., preferably 0° to 30° C., an acid at a pH below 3 and by converting the suspension obtained at 50° to 150° C. to the dianhydride. The procedure is advantageously carried out as follows: The aqueous alkali metal salt solution is prepared from perylene-3,4,9,10-tetracarboxylic acid and an excess of aqueous alkali, while the acid to which the alkali metal salt solution is then added is used in an excess of from 0.1 to 6 equivalents, referred to the alkali. The transparency of the dianhydride pigment obtained may be influenced by the concentration of the alkali metal salt solution and of the acid.

Said synthesis is preferably followed by a treatment with a solvent, which comprises adding, after competetion of the dianhydride formation, an organic solvent to the acid suspension or preferably after isolation to the humid filter cake and aftertreating at 35° to 200° C., preferably at 70° to 120° C.

Suitable organic solvents for the aftertreatment are those that dissolve the dianhydride not at all or only sparely, for example aliphatic alcohols having up to 5 carbon atoms, aromatic chlorohydrocarbons, ketones, esters of low-molecular weight carboxylic acids as well as aliphatic chlorohydrocarbons.

The solvent may be used in a 0.1 to 30-fold quantity by, referred to perylene-3,4,9,10-tetracarboxylic acid, preferably the 0.5 to 5-fold quantity, in particular an equal weight.

The surfactants are used preferably in a quantity from 0.1 to 30%, in particular from 5 to 15%, referred to the weight of the dianhydride. Suitable surfactants are non-ionic, cation-active and in particular anion-active substances.

Suitable non-ionic surfactants are fatty alcohol polyglycol ethers, fatty acid polyglycol esters and alkylphenolpolypolyglycol ethers.

Suitable (potentially) cation-active substances are ammonium salts or ammonium hydroxides, fatty amine oxethylates, fatty amine polyglycol ethers and basic colophony derivates.

Suitable anion-active surfactants are fatty acid taurides, fatty acid N-methyl taurides, fatty acid isethionates, alkylnaphthalene sulfonates, alkylphenylsulfonates, alkylphenolpolyglycol ether sulfates, fatty alcohol polyglycol ether sulfates as well as in particular soaps and resins, as well as alkali metal salts of fatty acids, napthenic acids and resin acids as well as modified colophony maleinate resins or fumaric acid colophony resins.

The selection of the surfactants and solvents added depends on the intended use of the pigments. For example, a combination of resin soap and lower alcohols is particularly suitable for pigments intended for use in metallic varnish systems.

A particularly preferred embodiment of the process of the invention consists in dissolving perylene-3,4,9,10-tetracarboxylic acid in a small excess of potassium hydroxide solution, adding the surfactant to the aqueous solution of the potassium salt at 0° to 30° C. and adding the mixture within 5 to 60 minutes to the acid used in an excess, preferably an excess of dilute hydrochloric or sulfuric acid of from 0.1 to 6 mols, referred to the potassium hydroxide.

The precipitated tetracarboxylic acid is thereafter heated to 50° to 150° C., isolated after having been converted completely to its dianhydride, and the humid filter-cake is treated with up to a fine-fold quantity of an organic salt at 70° to 120° C.

The dianhydride prepared according to the invention is suitable for pigmenting plastic materials and varnishes, owing to its high transparency, its tinctorial strength, its fastness to weathering and to light, and owing to its good compatibility with all metallic varnish systems customary in use, in particular for metallic varnishes for automobiles.

The following examples serve to illustrate the invention. Percentages given are by weight:

EXAMPLE 1

50 g of perylene-3,4,9,10-tetracarboxylic acid dianhydride were introduced into a solution of 63 g of potassium carbonate in 2,255 ml of water and the resultant mixture was stirred for 1 hour at 95° C. After addition of 26 g of animal charcoal, stirring was continued for a further 15 minutes and the mixture was subsequently clarified. A solution of 5 g fumaric acid-colophony resin soluble in alcohol (density 1.15, acid number 110–130, color index below 30) in 75 g of a 1% potassium hydroxide solution was added to the filtrate obtained and stirring was continued for half an hour at 60° C. After cooling to 25° C., this solution was added dropwise within 15 minutes to a mixture of 600 ml of water and 600 ml of 31% hydrochloric acid. The mixture obtained was heated to 80° C. and stirring was continued for one hour at this temperature. The product was suction-filtered while hot, washed until neutral and dried at 80° C. 50.9 g of dianhydride pigment, which is excellently suitable for dyeing varnishes, in particular metallic varnishes, were obtained.

EXAMPLE 2

50 g of perylene-3,4,9,10-tetracarboxylic acid dianhydride were introduced into a solution of 35 g of potassium hydroxide (85%) in 1,780 ml of water. The mixture was stirred for one hour at 95° C. and filtered. At 25° C. a solution of 7 g of the resin specified in Example 1 in 140 g of 1% potassium hydroxide solution was added and the mixture was stirred for half an hour at 25° C. This solution was added dropwise to a mixture of 215 ml of water and 215 ml of 31% hydrochloric acid within 15 minutes. The suspension obtained was heated to 80° C. and stirring at this temperature was continued for one hour. The product was suction-filtered while hot, washed until neutral and dried at 80° C. 55.6 g of pigment which is excellently suitable for dyeing metallic varnishes were obtained.

EXAMPLE 3

50 g of perylene-3,4,9,10-tetracarboxylic acid dianhydride were introduced into a solution of 35 g of potassium hydroxide (85%) in 800 ml of water and dissolved therein by stirring for one hour at 25° C. After addition of 10 g of a commercial 50% resin soap, stirring was continued for half an hour and the solution was clarified. The filtrate was added dropwise to a mixture of 200 ml of water and 200 ml of 31% hydrochloric acid within 15 minutes. The suspension obtained was heated to 80° C. and stirring was continued at this temperature for one hour. The product was suction-filtered while hot and washed neutral.

The weight of the filter cake was completed to 1,055 g by adding water, 55 g of isobutanol were added and the mixture was boiled for one hour. Isobutanol was distilled off until a vapor phase temperature of 100° C. was reached. The pigment was suction-filtered while hot and dried at 80° C.

54.5 g of a pigment which is excellently suitable for dyeing metallic varnishes were obtained.

EXAMPLE 4

The procedure was as in Example 3, except that 600 ml of 31% hydrochloric acid were used. 52.3 g of pigment, particularly suitable for dyeing acrylic resin and polyester metallic varnishes owing to its extremely high transparency were obtained.

EXAMPLE 5

The procedure was as in Example 3, except that 11 g of isobutanol were added. There were obtained 52.6 g of pigment, which is likewise suitable for dyeing metallic varnishes.

EXAMPLE 6

The procedure was as in Example 3, except that chlorobenzene was added instead of isobutanol. There were obtained 51.5 g of pigment, which is suitable for dyeing metallic varnishes.

EXAMPLE 7

The procedure was as in Example 3, except that 55 g of ethanol were used instead of isobutanol and the mixture was heated at 125° C. for 3 hours, in an autoclave. There were obtained 50.4 g of pigment which is likewise suitable for dyeing metallic varnishes.

EXAMPLE 8

The procedure was as in Example 3, except that only 500 ml of water were used for dissolving the perylene3,4,9,10-tetracarboxylic acid dianhydride and 5 g of colophony were used instead of 10 g of resin soap. There were obtained 51.7 g of pigment which is likewise suitable for dyeing metallic varnishes.

EXAMPLE 9

The procedure was as in Example 3, except that there only 5 g of the 50% resin soap were used. 51.2 g of pigment were obtained, which is likewise suitable for dyeing metallic varnishes.

EXAMPLE 10

The procedure was as in Example 3, except that 20 g of the 50% resin soap were used. 58.1 g of pigment were obtained, which is likewise suitable for dyeing metallic varnishes.

EXAMPLE 11

The procedure was as in Example 3, except that the batch was boiled for 5 hours after the addition of isobutanol. 54.5 g of pigment, likewise suitable for dyeing metallic varnishes, were obtained.

EXAMPLE 12

The procedure was as in Example 3, except that the suspension obtained after the dropwise addition of the solution to the acid was heated for 3 hours at 80° C. 53.3 g of pigment were obtained, which is suitable for dyeing metallic varnishes.

EXAMPLE 13

The procedure was as in Example 3, except that the suspension obtained after the dropwise addition of the solution to the acid was heated for one hour at 100° C. 53.6 g of pigment were obtained which is suitable for dyeing metallic varnishes.

EXAMPLE 14

The procedure was as in Example 3, except that the suspension obtained upon dropwise addition of the solution to the acid was stirred for 24 hours at 25° C. 52.1 g of pigment suitable for dyeing metallic varnishes were obtained.

What is claimed is:

1. A method for making an aqueous suspension of a perylene-3,4,9,10-tetracarboxylic acid dianhydride pigment, which method comprises adding a solution consisting essentially of water, an alkali metal salt of perylene-3,4,9,10-tetracarboxylic acid, and a surfactant to an excess of acid, referred to total alkali, at a pH below 3 and at a temperature of 0° C. to 90° C. and then heating the mixture to a temperature of 50° C. to 150° C.

2. A method as in claim 1 wherein said solution is added at a temperature of 0° C. to 30° C.

3. A method as in claim 1 wherein the acid to which said solution is added is in an excess of 0.1 to 6 equivalents referred to total alkali.

4. A method as in claim 1 wherein said surfactant is added in an amount from 0.1 to 30 percent by weight of said dianhydride.

5. A method as in claim 1 wherein said surfactant is added in an amount from 1 to 10 percent by weight of said dianhydride.

6. A method as in claim 1 wherein said surfactant is a soap or an alkali soluble resin.

7. A method as in claim 1 which comprises the further step of adding an organic solvent to said suspension of dianhydride in an amount from 0.1 to 30 times the weight of said dianhydride, and heating the mixture at 35° C. to 200° C.

8. A method as in claim 7 wherein said solvent is added in an amount from 0.5 to 5 times the weight of said dianhydride.

9. A method as in claim 1 which comprises the further steps of filtering said suspension to obtain said dianhydride as a moist filter cake, then adding an organic solvent thereto in an amount from 0.1 to 30 times the weight of said dianhydride, and heating the mixture at a temperature from 70° C. to 120° C.

10. A method as in claim 9 wherein said solvent is added in an amount from 0.5 to 5 times the weight of said dianhydride.

11. A perylene-3,4,9,10-tetracarboxylic acid dianhydride pigment made by the method of claim 1.

12. A perylene-3,4,9,10-tetracarboxylic acid dianhydride pigment made by the method of claim 7.

13. A perylene-3,4,9,10-tetracarboxylic acid dianhydride pigment made by the method of claim 9.

* * * * *